United States Patent

[11] 3,609,743

[72] Inventors Murray Lasoff
Downingtown, Pa.;
Irwin R. Holmes, Willingboro, N.J.; John R. Port, King of Prussia; Edward F. Myers, Lansdowne, Pa.

[21] Appl. No. 613,264
[22] Filed Feb. 1, 1967
[45] Patented Sept. 28, 1971
[73] Assignee Burroughs Corporation
Detroit, Mich.

[54] DISPLAY UNIT
14 Claims, 12 Drawing Figs.

[52] U.S. Cl. ........ 340/324, 178/30
[51] Int. Cl. ........ G08b 11/00
[50] Field of Search ........ 340/324, 324.1; 178/30, 24, 5, 5.6, 6, 6.6, 6.8

[56] References Cited

UNITED STATES PATENTS

| | | | |
|---|---|---|---|
| 3,166,636 | 1/1965 | Rutland et al. | 178/30 |
| 3,175,208 | 3/1965 | Simmons | 340/324.1 |
| 3,241,120 | 3/1966 | Amdahl | 340/324.1 |
| 3,388,391 | 6/1968 | Clark | 340/324.1 |

*Primary Examiner*—Thomas B. Habecker
*Assistant Examiner*—Marshall M. Curtis
*Attorney*—Carl Fissell, Jr.

ABSTRACT: The cathode-ray tube of a standard television monitor is used for presenting a visual display of alphanumeric characters, punctuation marks and other marks used in business correspondence, and which have been placed into a storage device in binary coded form. A character generator is sensitive to the character codes in the storage device and, in timed relation with the scanning of the cathode-ray tube screen by the cathode beam, it generates and causes the display of horizontal portions of each character. A keyboard is provided to enable an operator to enter and load data for display into the storage device. An input device is also provided to enable a local or remotely situated device, which may be another display unit or data processor, for example, to also enter and load data for display into the storage device. A cursor presentation, in the form of a movable mark or symbol, which is displayed on the cathode-ray tube screen, is provided to enable the operator to visually determine the place on the screen where the next alphanumeric entry is to take place. Several control keys are provided on the keyboard which enable the operator to perform various normal typewriter control functions, such as carriage return, backspace, etc. The keyboard is also provided with keys which enable the operator to highlight the display by underscoring one or more characters, as desired. The keyboard is also provided with keys which enable the operator to correct or otherwise edit the data being displayed on the screen. Thus, the operator may erase certain characters, or simply overwrite them with new characters. The invention provides the necessary electronic circuits to permit messages to be transmitted to, or received from, local or remotely situated devices. Suitable circuitry, and control keys on the keyboard, enable the operator to transmit a preselected portion of the message being displayed, or the entire message, as desired. Also, an associated device, such as a data processor, for example, can transmit a message to the display unit and have it displayed on a selected area of the screen. The circuitry also permits the data processor to control the transmission of data to it, so that it can cause all or only a part of the screen area display to be transmitted to it.

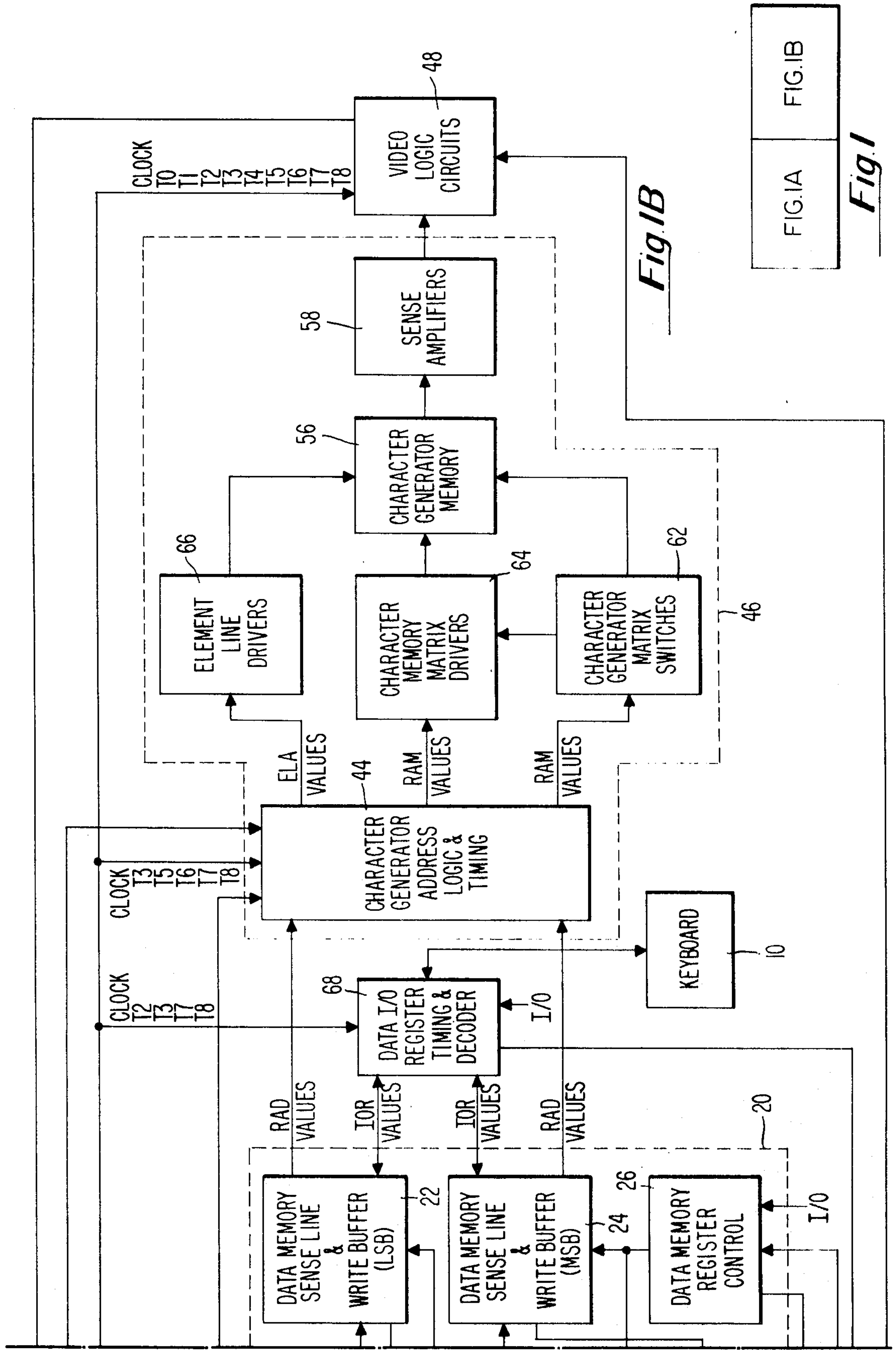
Fig. IB, Fig. I

INVENTORS.
MURRAY LASOFF
IRWIN R. HOLMES
JOHN R. PORT
EDWARD F. MYERS

BY Samuel Kane
ATTORNEY

INVENTORS.
MURRAY LASOFF
IRWIN R. HOLMES
JOHN R. PORT
EDWARD F. MYERS

BY Samuel Kane
ATTORNEY

INVENTORS.
MURRAY LASOFF
IRWIN R. HOLMES
JOHN R. PORT
EDWARD F. MYERS

BY Samuel Kane
ATTORNEY

| $b_4 b_3 b_2 b_1$ | $b_7, b_6, b_5$: 001 | 010 | 011 | 100 | 101 | 110 | 111 | 000 |
|---|---|---|---|---|---|---|---|---|
| 0000 | | SPACE | 0 | @ | P | | | |
| 0001 | CLEAR MEMORY | CUN | 1 | A | Q | | | |
| 0010 | | " (QUOTES) | 2 HJ | B | R | | | STX |
| 0011 | | ESC | 3 VJ | C | S | | | ETX |
| 0100 | TRANSMIT ⊡ | $ | 4 | D | T | | | |
| 0101 | | % | 5 | E | U | | | |
| 0110 | SYNC | & | 6 | F | V | | | |
| 0111 | | BKA | 7 | G | W | | | |
| 1000 | | ( | 8 | H | X | | | TRXMT |
| 1001 | | ) | 9 | I | Y | | | |
| 1010 | | * | : | J | Z | | | LINE FEED ⊡ |
| 1011 | | + | ; | K | [ | | | |
| 1100 | | , | < | L | X (MULT) | | | |
| 1101 | | – | = | M | ] | | BACK SPACE ⊡ | CAR RETURN |
| 1110 | | . | > | N | EKA | | | SET KATF |
| 1111 | | / | ? | O | GM | | RUB OUT ⊡ | RESET KATF |
| | CONTROL MODE | DATA MODE | | | | CONTROL MODE | | |

INVENTORS.
MURRAY LASOFF
IRWIN R. HOLMES
JOHN R. PORT
EDWARD F. MYERS
BY Samuel Kane
ATTORNEY INVENTORS.
MURRAY LASOFF
IRWIN R. HOLMES
JOHN R. PORT
EDWARD F. MYERS
BY
Samuel Slane
ATTORNEY

DISPLAY UNIT

BACKGROUND OF THE INVENTION

This invention relates generally to data handling systems and more particularly to such systems wherein the data is converted to a perceptible form such as for visible presentation on the face, or screen, of a cathode-ray tube. A somewhat similar type of display unit, or display system, is described and claimed in a copending application of Murray Lasoff, Irwin R. Holmes and Thomas J. Dodds, Jr. entitled "Display System," Ser. No. 557,194, filed June 13, 1966 now U.S. Pat. No. 3,505,665 and assigned to the same assignee as the instant invention.

SUMMARY OF THE INVENTION

One of the objects of the present invention is to provide improvements in data handling systems.

More specially, it is an object of this invention to provide improvements in data handling systems for display applications.

Another object of the invention is to provide a display unit for presenting a visible display of symbols, usually in the form of alphanumeric characters, punctuation marks and other marks generally used in business correspondence.

A further object of the invention is to provide a display unit which may have a plurality of data input sources.

More specially, it is an object of this invention to provide a display unit which may have both keyboard and data processor inputs.

A further object of the invention is to provide a display unit which is capable of both transmitting to and receiving data from a data processor.

Another object of the invention is to provide a display unit wherein displayed data may be corrected or otherwise edited without rewriting the entire display.

A further object of the invention is to provide a display unit which may utilize a standard television (TV) monitor.

Another object of the invention is to provide such a display unit which may be operated at the standard TV frame regeneration rate with standard TV interlaced scanning.

Still another object of the invention is to provide a display unit which permits a message to be displayed in different color presentations such as, for example, black characters on a white background, or white characters on a black background.

A further object of the invention is to provide such a display unit whereby the different color presentations may be displaced simultaneously.

Another object of the invention is to provide a display unit which readily lends itself to principally digital operation that preferably involves no digital-to-analogue converters, so that the ranges of operation are greatly increased and the sensitivity to changes vastly diminished.

In accordance with the above objects, and considered first in one of its broader aspects, the invention comprises a display medium having horizontal and vertical character positions, and a storage device having a plurality of word locations each having a horizontal address and a vertical address, and each adapted to contain a plurality of character codes. A suitable device is provided for entering input date, and with the provision of means for changing the input data into character codes, each representing a character to be displayed on the display medium. Means is provided for loading a plurality of character codes into each of the word locations. The invention also utilizes a horizontal means for sequentially addressing the horizontal addresses of the word locations and for establishing the corresponding horizontal character display positions of the character codes therein, and a vertical means for sequentially addressing the vertical addresses of the word locations and for establishing the corresponding vertical character display positions of the character codes therein.

Additional means is provided for transferring the addressed multiple character code words in succession into a storage means. A display generating means is further provided which is responsive in succession to each character code of each word in the storage means for generating successive displays, at the successive corresponding character display positions established by the horizontal means and the vertical means, of at least a portion of each of the corresponding characters of each word.

The invention will be more clearly understood when the following detailed description of the preferred embodiment thereof is read in conjunction with the following drawings:

BRIEF DESCRIPTION OF THE DRAWINGS

FIGS. 1A and 1B, when placed together as shown in FIG. 1, constitute a block diagram of a display unit constructed in accordance with the invention;

DESCRIPTION OF THE PREFERRED EMBODIMENT

Figure 1A:
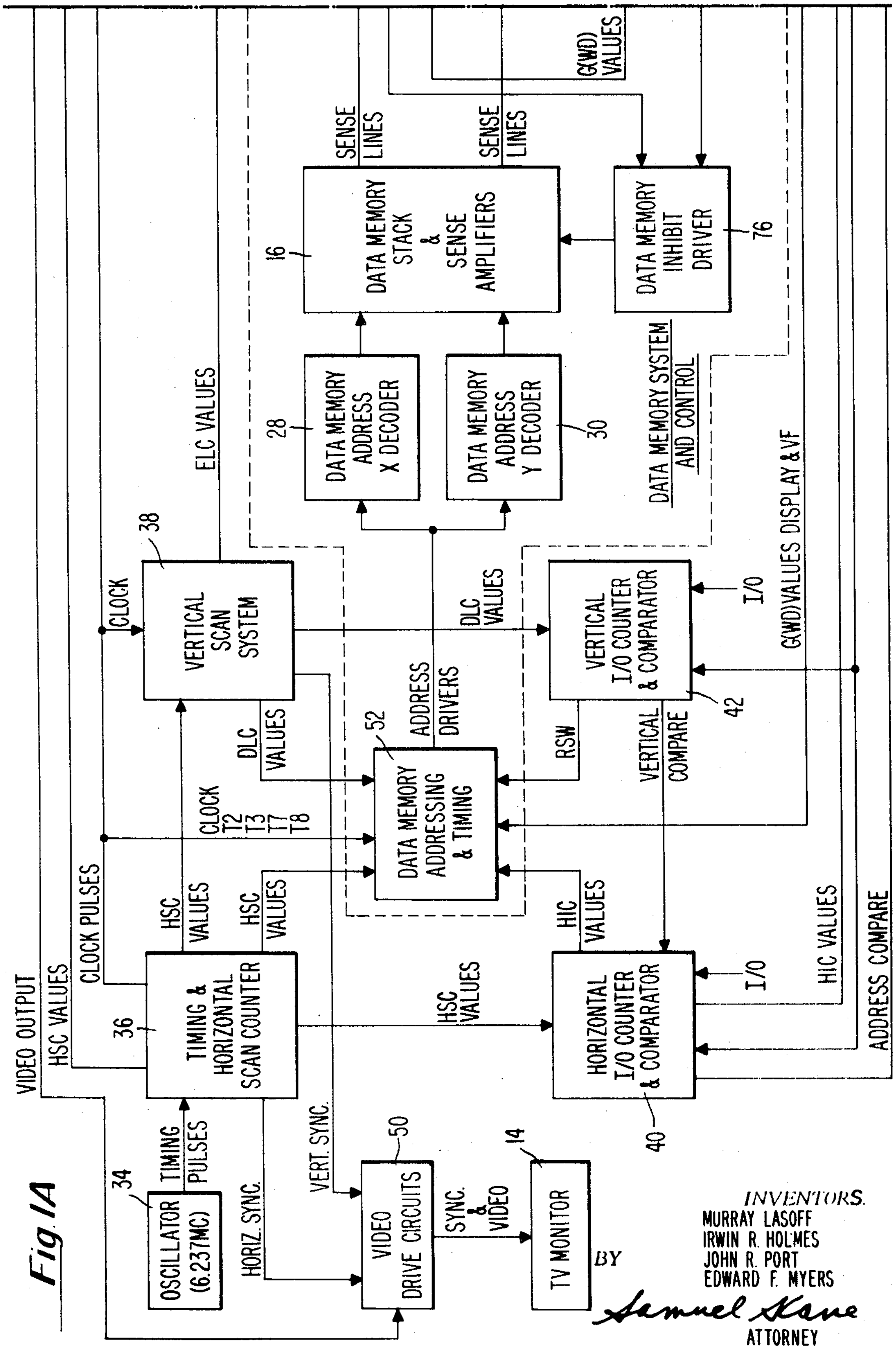

The display unit of the present invention is a low-cost input/output device which utilizes a keyboard 10 (FIGS. 1B and 5) for manual entry of data by an operator, and the cathode-ray tube 12 (FIG. 6) of a standard television (TV) monitor 14 (FIG. 1A) to display the composed message. The display unit can be used to communicate with other similar display units, or with associated remote or local devices, such as a data processor. It can be interfaced directly to a data processing system, or it can be connected to communicate via land lines by utilizing standard modems (modulator-demodulator) and data rates. The keyboard 10 is used for entering data into the system and for composing such data into a text consisting of alphanumeric characters, punctuation marks and other marks, as shown in the tabulation in FIG. 4.

The display unit is capable of being operated in three different modes. One mode of operation is the operator input mode (compose) in which the display unit is locked out to the communications and only the keyboard 10 may be used for entering date into a data memory stack 16 (FIG. 1A) for display on the cathode-ray tube 12. A second mode of operation is the output mode (send mode) in which the keyboard 10 is locked out and the data contained in the memory stack 16 is transmitted to a receiving station, which may be either locally or remotely situated Completion of the transfer of the data message in the output mode places the display unit into the receive mode. The third mode of operation is the input mode (receive mode) in which the keyboard 10 remains locked out and data is received, stored in the memory stack 16 and displayed on the cathode-ray tube 12. Completion of the receive mode is signified by the receipt of an end-of-text code ETX (FIG. 4) which serves to unlock the keyboard 10 for operator input.

The illustrative embodiment of the invention or display unit, contains a 360-word, 12-bit per word magnetic memory 16, preferably of the magnetic core, coincident current destructive readout type. Accordingly, the memory stack 16 contains a stack of 12-bit planes with each bit ...

magnetic cores arranged in an 18×20 matrix, and with 180 cores in the X-direction, and 20 cores in the Y-direction. With 360 words, there are two 6-bit characters per 12-bit word, so that the illustrative contents of the memory 16 are 720 characters. Accordingly, the display unit is organized to visibly display the 720 character content of the memory 16 in an illustrative 20-character × 36-character presentation on a suitable medium, which in this embodiment of the invention is the screen 18 (FIG. 6) of the cathode-ray tube 12. It is understood that this character capacity and bit capacity of the memory 16 are not limiting, but only illustrative.

In connection with the tabulation of character codes shown in FIG. 4, it is noted that all seven bits of the character codes are used for input/output operations, as will appear more fully hereinafter, however, for internal operations and for loading from the keyboard 10 the sixth bit $b_6$ is omitted to obtain a 6-bit code.

As shown in FIGS. 1A and 1B, the data memory stack 16 is part of an overall data memory system and control 20. Except for two data memory sense line and write buffers 22 and 24, and a data memory register control 26, the data memory system 20 is similar in construction and operation to the 1,024-word, 6-bit per word memory disclosed and claimed in a copending application of Edward F. Myers and John R. Port, Ser. No. 542,586, filed Apr. 14, 1966, and assigned to the same assignee as the instant invention. Therefore, reference may be had to the Ser. No. 542,586 application for details of the construction and operation of a data memory system similar to the data memory system 20, illustrated in FIGS. 1A and 1B. Besides the difference in matrix construction, other differences in the data memory system in the instant invention application, as compared to the data memory system in Ser. No. 542,586 application are that (1) the present invention reads out two 6-bit characters at a time, each into an individual buffer 22 or 24, (2) the X- and Y-decoders 28 and 30 (FIG. 1A) of the present invention utilize a 2×3 matrix, and (3) out of a possible 24 address lines for the X- and Y-matrices, the present invention utilizes only 18 address lines in the X-matrix and 20 lines in the Y-matrix. In other respects, the two memory systems are similar in construction and operation. It might also be mentioned at this time that the particular data memory system 20 is not limiting, since other forms of storage devices may be used in the present invention.

Figure 6:
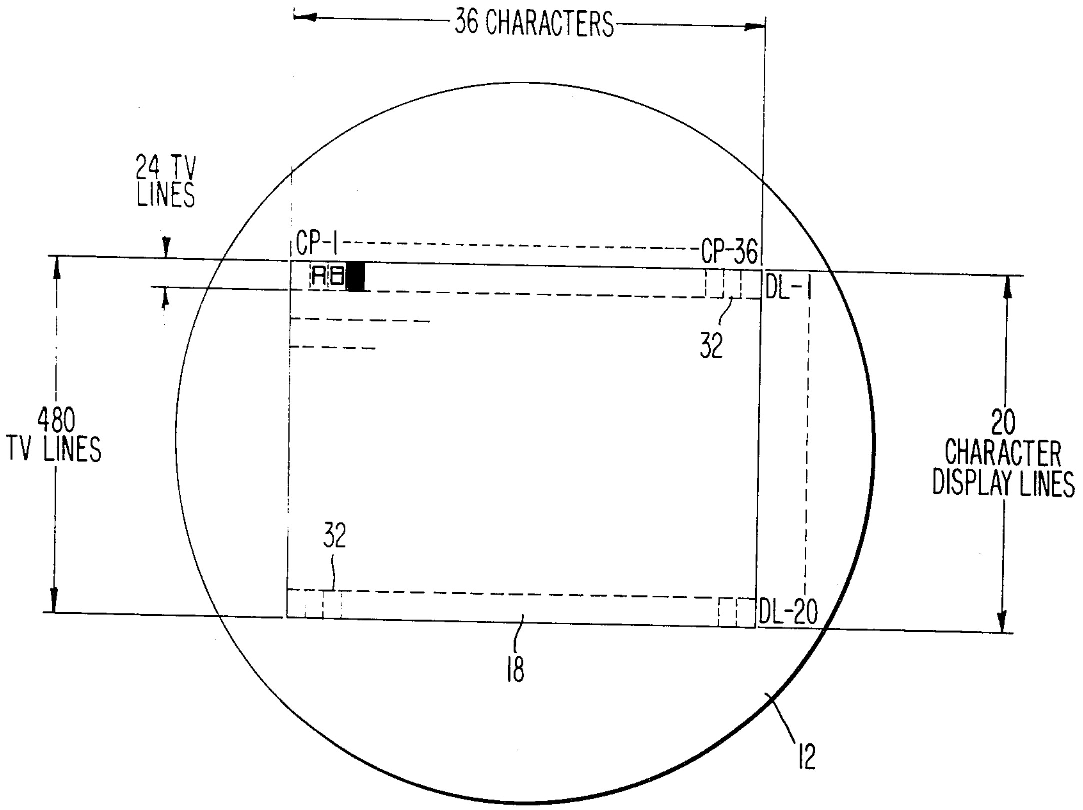
FIG. 6 illustrates the screen of a cathode-ray tube and an illustrative display thereon.
Figure 8:
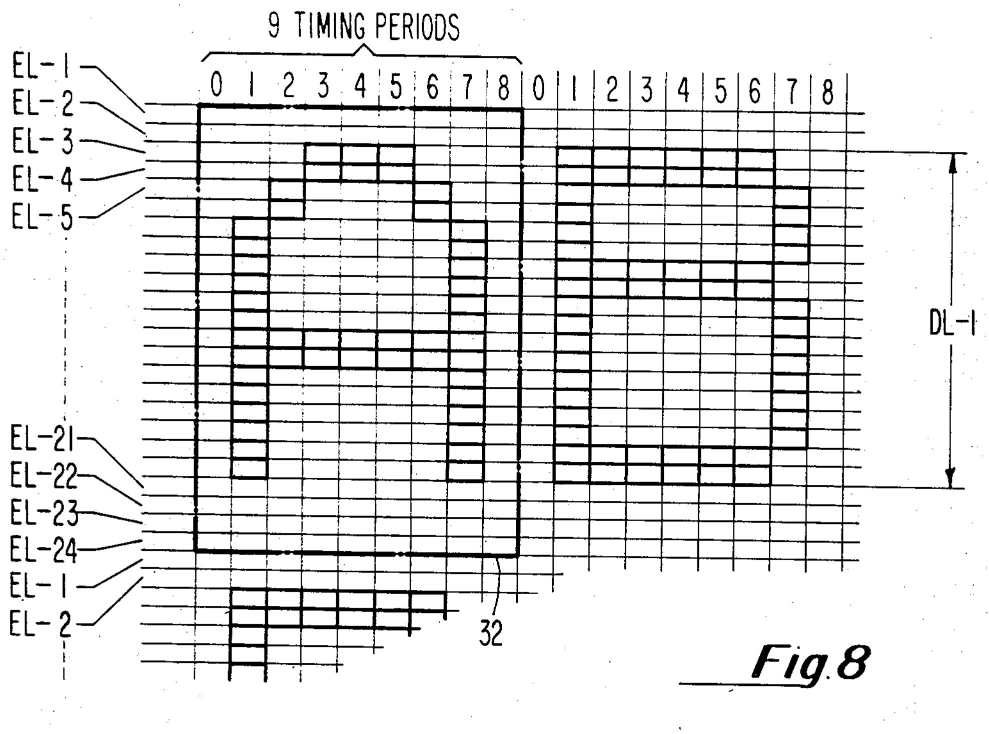
FIG. 8 illustrates the dot matrix construction of the characters to be displayed.

The invention utilized a dot matrix writing technique with all system timing based on the standard TV timing system. As indicated previously, and as shown in FIG. 6, the illustrated embodiment of the invention is organized to display 36 characters on each of the 20 horizontal character display lines DL–1 to DL–20. Each character location of the standard two-field interlaced display frame occupies an area 32 (see also FIG. 8) made up of 9 ×24 dots. The actual character within this area 32 is made up of a 7 ×18 dot matrix, leaving one column of dots on the left and right, and two rows of dots on the top and bottom for spacing between characters. An additional two rows of dots are provided at the very bottom of the area 32 for underlining. The dots are actually short lines, generated by the cathode beam.

An oscillator 34 (FIG. 1A) having a frequency of 6.237 mc. generates the basic timing for the display unit. The oscillator 34 triggers a timing unit in a block 36. The timing unit produces nine discrete timing periods (FIG. 8) in a total time of 1.44 μsec. (1/6.237mc. × 9). Seven of the nine timing periods represent the width of a character, while the other two timing periods represent the space between characters. Therefore, there are 36 groups of these nine discrete timing periods, one for each of the 36 horizontal character display positions CP–1 to CP–36 (FIG. 6). There are also eight additional groups of these nine timing periods for horizontal flyback. Thus, a total of 44 groups of nine timing periods is required for the beam of the cathode-ray tube 12 to scan one TV line, or element line, of a horizontal line of characters once.

The timing unit also produces the various timing and control signals for operating the several counters, memory units and other components, and for effecting the various gating and transfer functions, as will appear more clearly hereinafter.

A horizontal scan counter in block 36 (FIG. 1A) counts the 44 groups of timing periods in a total cycle time of 63.36 μsec. (1.44 μsec., × 44) which is approximately the horizontal scanning rate of a standard TV monitor. The horizontal scan counter 36 performs the three functions of (1) generating every 63.36 μsec., the horizontal SYNC pulse to the TV monitor 14, (2) producing every 1.44 μsec. the horizontal address of the character whose element line is about to be displayed on the screen 18 of the cathode-ray tube 12, and (3) timing the horizontal flyback period of 11.52 μsec. (1.44 μsec. × 8).

A vertical scan system 38 (FIG. 1A) generates the vertical SYNC signal to the TV timing of the TV vertical flyback, and is provided with a display line counter DLC which keeps track of the vertical address, or character display line count, of the character to be displayed, and an element line counter ELC, which keeps track of which element line or TV line of each character is being displayed.

As indicated previously, a total of 24 element lines EL–1 to EL–24 (FIG. 8) constitutes the vertical dimension of the character area 32 of a character. Eighteen of the element lines, EL–3 to EL–20, are used for generating the character, and the other six are used for vertical spacing. The element line counter ELC of the vertical scan system 38 keeps track of which element lines will be used for generating the character, and which element lines will be used for spacing.

Since the invention is preferably designed for standard TV operation, the picture displayed, as indicated previously, is the standard two-field interlaced frame. Accordingly, during one vertical field (one-sixtieth second) all the odd element lines, EL–1, EL–3, EL–5, etc. are displayed, and during the next display field all the even element lines, EL–2, EL–4, EL–6 etc. are displayed, and these even-line displays are identical in appearance to those of the previous odd-line field; hence the display is flicker-free. Also, since the vertical frequency is 60 c.p.s. or powerline frequency, no jitter is perceptible. Thus, the information in the raster, or display frame, appears the same on adjacent pairs of odd and even element lines, such as lines EL–1 and EL–2, or EL–3 and EL–4, etc. Thus, each dot appears twice as high in the display frame as it does in the single field. Since a total of 18 element lines are necessary to display one character, 18 memory cycles are necessary to accomplish this display, as will appear more fully hereinafter. In accordance with standard TV practice, the display frame rate is 30 c.p.s.

The data memory 16 receives one part of its address from the horizontal scan counter 36, which provides the horizontal address of the character to be displayed, and the other part of its address from the display line counter DCL of the vertical scan system 38, which provides the vertical address of the character to be displayed. As will be explained more fully later on, when loading from the keyboard and from the input/output section is described, the data memory 16 also receives addresses from a horizontal input/output counter in a block 40, and from a vertical input/output counter in a block 42.

Each output of the data memory 16 are the character codes of two characters to be displayed. These character codes are transferred sequentially to a character generator address logic and timing block 44 (FIG. 1B), which is part of a character generator memory system 46. The memory system 46 is described and claimed as a wired core memory in a copending application of Edward F. Myers and John R. Port, Ser. No. 599,811, filed Dec. 7, 1966, entitled "Wired Core Memory" and assigned to the same assignee as the instant invention. Reference may be had to that patent application for the details of construction and operation of the character generator memory system, or wired core memory 46. THe character generator memory system 46 decodes in succession each of the two character code outputs of the data memory 16, and from each decode it determines which character is to be displayed, and which one of the nine parts of the character is to be displayed in the particular display field. The output of the character generator memory system 46 is in the form of seven bits of data which are stored in the video logic circuits 48 where they are used to produce signals to control the blanking and unblanking of the cathode-ray tube beam to produce the display, on the screen 18 of the cathode-ray tube, of one of the nine rows of seven dots which are used to produce a character. Thus, the date displayed on the TV screen 18 is a visual display of the information stored in the data memory 16.

The actual signal sent to the TV monitor 14 is produced in the logic circuitry of the video drive circuits 50 (FIG. 1A). It is a single composite signal made up of the video signal from the video logical circuits 48, the horizontal syne signal from the horizontal scan counter 36, the vertical sync signal from the vertical scan system 38, and special timing signals which produce the special serrations and equalizing pulses. All these signals combine to produce a composite signal which meets all Federal Communications Commission (FCC) regulations for standard television signals.

The two-character words are stored in the memory 16 in display order sequence, which when referenced to the screen 18 is from left to right, and from top line to bottom line, and with the data words stored in the memory 16 in consecutive memory locations.

Each display field, or display cycle, is synchronized at the line frequency (60 cycles per second) so that the content of the memory 16 is displayed in less than one-sixtieth of a second. Depression of a START key (FIG. 5) initiates resetting of all control flip-flops and the generation of a start pulse which signals the beginning of a 60 cycle period and the commencement of the first display field.

Each display field begins by the application of timing signals from the oscillator 34 and the timing unit of the block 36 to return or reset the horizontal scan counter 36, the display line counter DLC and the element line counter, ELC, to their first position, or output state, which corresponds to a binary count of zero.

The horizontal scan counter 36 is a 6-bit counter whose first, or zero, bit determines the action to be taken by the data memory register control 26, and whose other five bits, bit one through bit five, are used for providing the horizontal address to the data memory system 20. As will appear shortly, when the zero bit of the horizontal scan counter 36 is storing a binary zero, the first character of the two-character word read out of the memory 16 will be displayed first, and when the zero bit of the horizontal scan counter 36 is storing a binary one, the second character of the two-character word read out of the date memory 16 will be displayed next. In other words, the state of the zero bit of the horizontal scan counter 36 determines the sequence in which the two characters of each memory word will be displayed.

The display line counter DLC of the vertical scan system 38 counter the 20 character display lines DL–1 to DL–20 and presents the vertical address to the data memory system 20. The display line counter DLC is a 5-bit counter. The element line counter DLC of the vertical scan system 38 is a 4bit counter and is used to provide 12 output states, or counts, from binary zero through binary 11, each output state corresponding to one element line or to a single sweep of the beam of the cathode-ray tube 12 in generating a single TV display line.

According to the logic used in the present embodiment of the invention, the vertical spaces between the character display lines are displayed without any action on the part of the data memory 16; that is, the memory 16 is not subjected to readout in order to display the vertical spaces. Thus, when the element line counter ELC is at zero count, the logic of the system will cause unblanking signals to be generated to the cathode-ray tube 12 so that the element line or vertical space EL–1 (FIG. 8) above the top character display line DL–1 will appear as a sequence of white dots, or short lines.

It might be mentioned at this time that the invention contemplates the use of various color schemes for the background of the screen 18 and the characters to be displayed thereon. For purposes of illustration, however, it is assumed that the background of the screen 18 is to be white, corresponding to unblanking of the cathode-ray tube beam, and that the characters displayed thereon are to be black, corresponding to blanking of the cathode-ray tube beam. Accordingly, when the element line counter ELC is at zero count, unblanking signals will be generated by the logic to obtain a white display of the space EL–1 above the first character display line.

After the active scan of the cathode-ray tube beam and during the horozintal flyback period, the element line counter ELC is counted up by one count. At this time, the horizontal scan counter 36 has a count of zero, the display line counter DLC has a count of zero, and the element line counter ELC has a count of one. These counters are now in condition to obtain a display of the first, or top, odd element line EL–3 of all of the characters on the first character display line DL–1.

The horizontal address from the horizontal scan counter 36, and the vertical address from the display line counter DLC are presented to a data memory addressing and timing unit 52 of the date memory system 20. The address is decoded by the X- and Y-decoders 28 and 30 to select the X- and Y-drive lines in the memory stack 16 for obtaining a coincident current readout of the first two-character word corresponding to the address presented. The readout is amplified by sense amplifiers in the block 16. One of the two 6-bit characters, the least significant bit character (LSB), is transferred and stored into a data memory sense line and write buffer 22, which is a 6-bit storage register, This character is the first of the 36 characters to be displayed on the first character display line DL–1 of the screen 18, and when displayed will appear in character position CP–1. The second of the two 6-bit characters, the most significant bit character (MSB), will similarly be transferred from the date memory 16 and stored in a data memory sense line and write buffer 24, which also is a 6-bit storage register. This second character position CP–2.

The two characters will be in the buffers 22 and 24 at the same time that the zero bit of the horizontal scan counter 36 is storing a zero. Therefore in response to this zero storage, the date memory register control 26, through a gating line G (WD), will effectively connect or gate the buffer 22 to the character generator address logic and timing 44 to initiate the display of the first odd element line EL–3 of the first character.

In accordance with the illustrative display in FIG. 6, the first character in character position CP–1 has been chosen for purposes of illustration to be a blank or space character. As will appear later on, when an alphanumeric character code is gated into the character generator 46, the result is that certain magnetic cores 54 (FIG. 3) will be switched from one state to another. However, in this instance, the transfer of the all-zero character code for a space (FIG. 4) from the buffer 22 into the character generator block 46 will not result in switching of any of the magnetic cores 54, so that in this case the output levels of the seven sense amplifiers 58 (FIG. 1B) will be applied to the video logic circuits 48 to cause generation of unblanking signals for displaying the first odd element line EL–3 of the space character. As will appear shortly, the inputs to the seven sense amplifiers 58 are the seven sense lines 60 shown in FIG. 3. Since the area 32 of a character is nine dots wide, or nine timing periods wide, the other two outputs are provided by the video logic circuits 48. Thus the video logic circuits 48 consist of a series of nine AND gates, two of which are operated to produce unblanking signals, and the other seven of which each have an input terminal connected to the output of one of the screen sense amplifiers 58. The nine gates in the video logic circuits 48 are clocked sequentially in synchronism with the sweep of the cathode-ray tube beam.

After the display of the first odd element lineEL–3 of the first character, the horizontal scan counter 36 counted up by one count. The zero bit of this counter will now store a binary one, however, the address portion of the counter will not yet be changed. This storage of a binary one in the zero bit of the horizontal scan counter 36 will cause the date memory register control 26 to effectively connect or gate the buffer 24 to the character generator system 46 so that the second character of the two-character generator address logic and timing unit 44.

Figure 3:
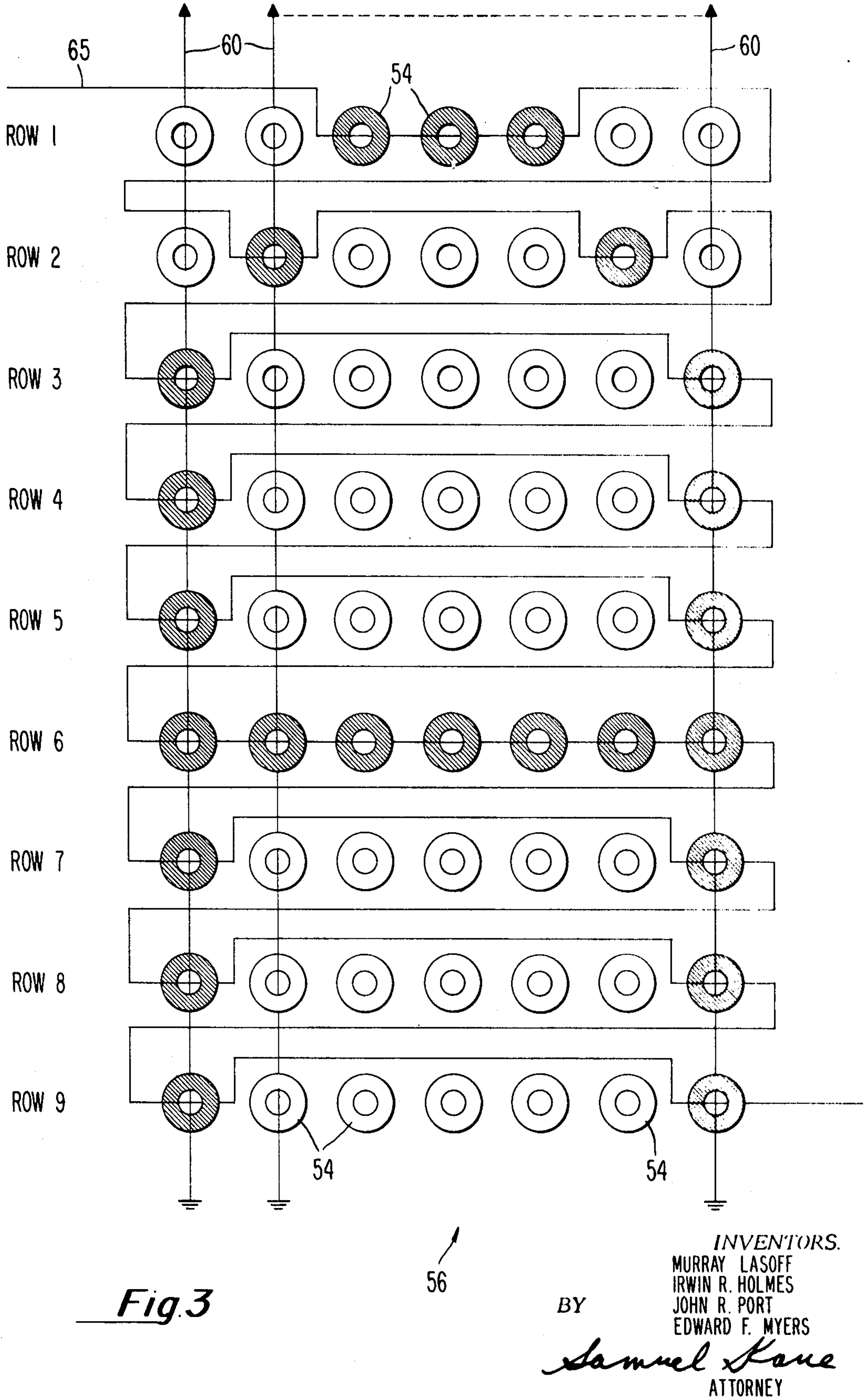
FIG. 3 is a schematic diagram of a portion of a wired core memory.

As described in the aforementioned patent application for a wired core memory Ser. No. 599,811, the character code is stored in a 6-bit character register of the character memory system 46. The character is then decoded into two groups of three bits each. The output of one group of three bits activates one of eight character generator matrix switches 62 (FIG. 1B), and the output of the other group of three bits activates one of eight character memory matrix drivers 64 (FIG. 1B). The eight switches 62 and the eight drivers 64 form an 8×8 matrix to select one of 64 character lines, each of which represents a displayable character and is uniquely wired to a 7×9 magnetic core matrix 56 (FIG. 3). The connections and wiring are such that only one character line is activated, and this character line is the drive line of the character selected for display. Each of the several character lines are threaded uniquely through the 7×9 core matrix to give the required uniquely through the 7 ×9 core matrix to give the required character information. For purposes of illustration, and to simplify the drawing, only one character line 65 is shown in FIG. 3 for generating a display of the letter "A".

Also associated with the matrix 56, but omitted from FIG. 3 for purposes of simplicity, are a reset line which links all of the cores 54 of the matrix, and a reset driver which is operable for energizing the reset line for switching the cores 54 to a reset state. Also associated with the matrix 56, but not shown therein, is a group of nine inhibit drive lines each connected to receive inhibit current from one of the nine element line drivers 66 (FIG. 1B). each of the inhibit drive lines is uniquely threaded through the matrix 56 so that it links all of the cores 54 in every row except one. The excepted row of cores 54 for each inhibit drive line is the row of cores which happens to be active at the particular instant.

The nine rows of cores 54 in the matrix 56 correspond to binary counts one through nine of the element line counter ELC. Thus at the instant under discussion, when the element line counter ELC is at count one, the group of seven cores 54 in row 1 is the active group. Accordingly, when the appropriate switch 62 and driver 64 are activated, they will cause current to flow in the character line 65 which tends to switch states of all of The cores 54 that the character line 65 links. Simultaneously, however, the count value of the element line counter ELC will be decoded by a decoder in block 44 so that the resulting element line address value ELA will cause the appropriate one of the nine element line drivers 66 to drive inhibit current through the corresponding one of the nine inhibit drive lines which links all of the cores in rows 2 to 9 inclusive, Therefore, the only cores 54 that will switch or be set at this time will be the three cores in row 1 which are linked by the character line 65, and which have been highlighted in the drawing by shading, for purposes of illustration. Therefore, the seven bits of data represented by the seven cores 54 in row 1 will be sensed by the seven sense lines 60 and will be amplified in the sense amplifiers 58 so as to provide seven output signals to the video logic circuits 48 for generating the blanking and unblanking signals to the cathode-ray tube 12 for generating the display of the first odd element line EL–3 of the character or letter "A."

On the writer portion of the memory cycle, the two character codes in the buffers 22 and 24, which Ag" this illustration represent a space and the letter "A," are written back into the data memory 16 at the same locations where they are stored previously.

At the beginning of the next memory cycle, the horizontal scan counter 36 is counted up by one count so that its zero bit now again stores a zero, and its address portion now reads the next horizontal address. The next horizontal address is then presented to the date memory addressing and timing unit 52 by the horizontal scan counter 36, as previously, so that the next two-character word is similarly read out of the data memory 16 and their first odd element lines EL–3 displayed in accordance with the particular wiring of their character lines in the cores 54 in row 1 of the matrix 56.

At the end of the scan of the first odd element line EL–3 by the cathode-ray tube beam and during the horizontal flyback period, the element line counter ELC is counted up by one count so that it now has an output state corresponding to a count of two. THe element line counter ELC is therefore in condition for taking part in the display of the second odd element line EL–5 of all 36 characters on the first character display line DL–1.

A t the end of the horizontal flyback period, the horizontal scan counter 36 is reset to its first position, or zero count.

Display of the second odd element line EL–5 of all the characters on the first character display line DL–1 takes place in a manner similar to that described for displaying the first odd element lime of the characters. Thus, when the character code for the letter"A" is read out for the second time in its second memory cycle, the group of cores 54 in row 1 will be the active group, and all the other cores 54 of rows 1 and 3 to 9, inclusive, will be inhibited by inhibit current flowing through a second one of the nine inhibit drive lines which links all the cores in rows 1 and 3 to 9, inclusive, and which is driven by a second one of the element line drivers 66. Accordingly, the two shaded cores 54 in row 2 that are linked by the character line 65 will be switched to the set state so that the seven bits of data from the cores in row 2 will similarly be sensed by the seven sense amplifiers 58 to provide blanking and unblanking signals to the cathode-ray tube 12 for obtaining a display of the second odd element line EL–5 of the letter "A".

As the cathode beam successively scans the screen 18 in horizontal lines, the element line counter ELC will be counted up successively until it attains its maximum count of 11. At this time, all of the nine odd element lines of all of the 36 characters on the first character display line DL–1 will have been displayed, and the cathode beam will then be in the process of displaying the space or element line EL–21 below the character display line. When the display of this space below the character display line. has been completed, this event signified the end of the display of the first row of characters in the first display field. During the ensuing horizontal flyback period, and in preparation for displaying the second horizontal row of characters, the element line counter ELC is reset to its first state, or area count, and the display line counter DLC counted up by one count to place the vertical address at the next character display line down on the screen 18. At the end of this horizontal flyback period, the horizontal scan counter 36 is reset to its starting position, or zero count.

The display process is repeated, as described above, for the next 19 character display lines DL–2 to DL–20 and the vertical spaces between them to complete the first display field. At the end of this display field, the element line counter ELC is reset to its zero count, the display line counter DLC is reset to its zero count during vertical flyback and the horizontal scan counter 36 reset after the horizontal flyback period to its zero count.

The above-described display cycle for the first display field is now repeated for the second display field so as to display the even-numbered element lines and obtain a complete two-field display frame of standard TV interlaced configuration.

Figure 2:
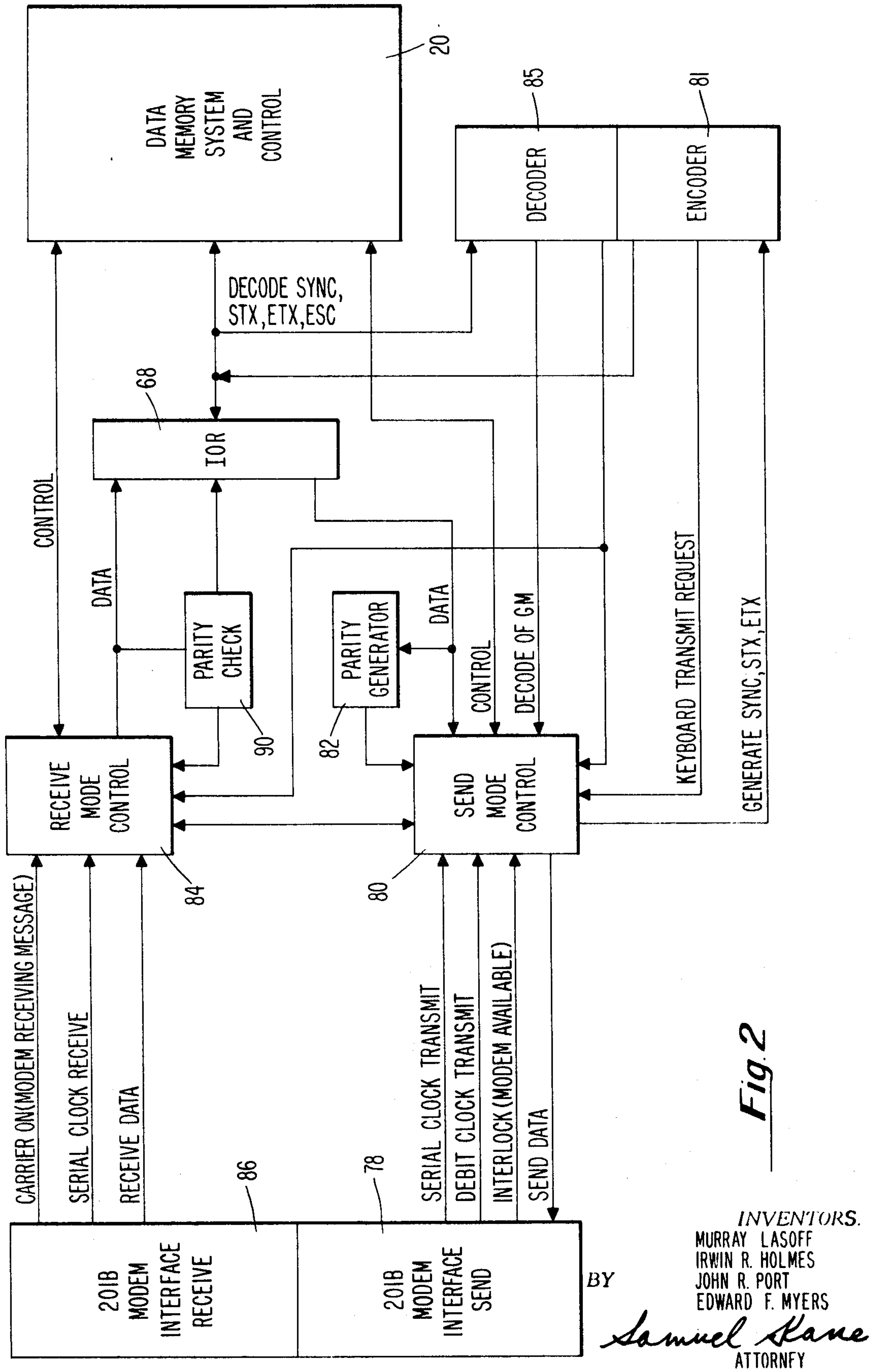
FIG. 2 is a block diagram of an input/output interface.

Data to be displayed may be entered into the date memory 16 either manually from the keyboard 10 or automatically from the associated data processor or other device via the input/output interface (FIG. 2). The keyboard mode of loading data will be described first.

Data is entered into the system in the keyboard mode by depressing the appropriate alphanumeric key on the keyboard 10. THe keyboard 10 may be electromechanical or electronic and is provided with keyboard logic which senses the depression of any key and causes the character represented by the key to be encoded in a 6-bit encoder which is embodied in the keyboard block 10. The keyboard logic also effectively connects or gates the keyboard 10 to a date input/output register timing and decoder 68 and causes the encoded character to be transferred into the date input/output register 68.

The date input/output register 68 is a 7-bit, parallel-serial storage register. Since the characters processed internally in the illustrated embodiment of the invention are 6-bit characters, only six bits of the data input/output register 68 are used when loading manually from the keyboard 10. The use of the data/output register 68 as a seven-bit register will be described later on when the input and output modes are described in connection with communication of the display unit with an associated date processor, The timing aspect in the block 68 relates to the timing for certain control codes which are not stored in the memory 16, and which will be described later one. The decoder in the block 68 is used for decoding these control codes.

The character code in the data input/output register 68 is transferred into the appropriate buffer 22 or 24 and then loaded into its appropriate position as one of the characters of the two-character word in the date memory 16, at the address specified by the horizontal input/output counter 40 and the vertical input/output counter 42. The horizontal input/output counter 40 is a 6-bit up/down counter, and similar to the horizontal scan counter 36, its first or zero bit determines the sequence in which character codes will be entered into the two-character words in the data memory 16, and its other five bits provide the horizontal address of the word in memory 16 in which the incoming character is to be loaded. The vertical input/output counter 42 is a 5-bit up/down counter and provides the vertical address to the date memory 16 for loading the incoming character.

Loading into the data memory 16 in the keyboard mode is accomplished during the vertical flyback period. Assuming that the data memory 16 is clear and that the horizontal input/output counter 40 and vertical input/output counter 42 are preset to their first position, or zero counts, the character code in the data input/output register 68 will be gated into the buffer register 22 by the date memory register control 26 in response to the output state of the zero bit of the horizontal input/output counter 40, which at this time is storing a zero. The character position of the first word of the data memory 16, and will be displayed during the during display cycles as the first character on the screen 18 the display cycles as the first character on the screen 18 at the upper left-hand corner thereof.

The next data character to be loaded in to the data memory 16 is similarly entered by depressing the appropriate key on the keyboard 10. A control signal will thereby be generated so as to cause the horizontal input/output counter 40 to be counted up by one count, so that its zero bit will now store a binary one, however, its address portion in the other five bits will still be at zero count. As previously, the second data character will be encoded into its 6-bit code in the encoder in the keyboard 10, and similarly transferred in to the data input/output register 68. The character code of this second data character will now be gated from the date input/output register 68 into the buffer 24 by the date memory register control 26 in accordance with the output state, which is now a binary one, of the zero bit of the horizontal input/output counter 40. The second character code in the buffer 24 is then written into the second character position of the first word of the data memory 16, and the horizontal input/output counter 40 counted up by one count. This concludes the procedure for loading a full two-character word into a single address of the data memory 16.

Entry of the next two characters into the keyboard 10 causes the horizontal input/output counter 40 to be similarly counted up so as to similarly load these two data character into the next address or word of the data memory 16. This procedure continues, as data is entered into the keyboard 10, until the 18th group of characters, making a total of 36 characters, has been loaded into the data memory 16. At this time, the horizontal input/output counter 40 will be reset by a control signal to its zero count, corresponding to character position CP–1 at the left-hand side of the screen 18, and the vertical input/output counter 42 will be counted up by one count by a control signal to place its output state, or address, at the next character display line down, DL–2, the screen 18.

A cursor presentation, in the form of a movable symbol 70 (FIGS. 6 and 7) displayed on the screen 18, is provided. The cursor 70 appears at the character position where the next alphanumeric entry is to take place, and is generated by the display unit by making a comparison of the horizontal counters 36 and 40, and of the vertical counter 42 and display line counter DLC. For the purpose of this comparison, the counts of all six bits of the horizontal counters 36 and 40 are compared. Thus, when the count of the horizontal scan counter 36 is equal to the count of the horizontal input/output counter 40, as indicated by a comparator in the block 40, and when the count of the display line counter DLC is equal to the count of the vertical input/ouptut counter 42, as indicated by a comparator in the block 42, the video logic circuits 48 will respond to the output signals of these comparators and provide blanking signals to the cathode-ray tube 12 through the video drive circuits 50, to generate the cursor 70 display.

When the data memory 16 has been cleared so that it is not storing any data, the cursor 70 will appear at the upper left-hand corner of the screen 18 at the first character position CP–1 of the top character display line DL–1, since at that time the counters 36, 40, 42 and DLC will be at their zero states. As each data character is loaded in to the data memory 16, its display will appear on the screen 18 at the character position where the cursor 70 is located, and the cursor 70 will move rightwardly in typewriter fashion as the result of the horizontal input/output counter 40 being counted up by one count. When the horizontal input/output counter 40 attains a full 6-bit output count of 35, the cursor 70 will have been stepped rightwardly and will be in the last character position CP–36. Upon the entry and display of a data character at this position, the horizontal input/output counter 40 will be reset to its first state, or zero count, by a control signal and the vertical input/output counter 42 will be counted up by one count to thereby move the cursor 70 to the first character position CP–1, on the next character display line down on the screen 18.

The invention provides to the operator various normal typewriter control functions, such as carriage return, backspace, etc., and for this purpose special control keys are provided on the keyboard 10. Thus by depressing a RETURN key, for example, a control code for this function will be encoded in the encoder of the keyboard 10 and decoded by the decoder in block 68, so that the resulting control signal will cause the horizontal input/output counter 40 to be reset to its zero count and the vertical input/output counter 42 to be counted up by one count, thereby returning the cursor 70 to the first character position CP–1, on the screen and positioning it into the next character display line down on the screen 18.

The backspace control function is effected by depressing a BACKSPACE key on the keyboard 10. The control code for this function is similarly encoded in the encoder of the keyboard 10, and decoded by the decoder in the block 68. This results in a control signal to the horizontal input/output counter 40 to cause it to be counted down by one count, to thereby move the cursor 70 back one character position on the display line. If the horizontal input/output counter 40 happens to be at zero count, corresponding to character position CP–1, then, in this ease, when the BACKSPACE key is depressed, the vertical input/output counter will be counted down by one count and the horizontal input/output counter 40 will be preset to its maximum count of 35, thereby placing the cursor 70 at the last character position CP–36 of the next character display line above.

A LINE FEED key is provided to move the display position one line down on the screen 18. By depressing this key, its control code is encoded in the keyboard 10 and decoded in the block 68 to cause a control signal to count up the vertical input/output counter 42 by one count, thereby positioning the cursor 70 to the same horizontal character position on the next character display line down on the screen 18.

Depression of the space bar 72 causes the cursor 70 to be stepped rightwardly to the next character position by causing a control signal to count the horizontal input/output counter 40 up by one count. If the cursor 70 happens to be in the last character position CP–36 of a display line at the time the space bar 72 is depressed, the horizontal input/output counter 40 will be reset to its first state or count, and the vertical input/output counter 42 will be counted up by one count, thereby positioning the cursor 70 to the first character position CP–1 on the next character display line down on the screen 18.

Depression of a repeat key REPT followed by depression of one of the alphanumeric keys causes the corresponding alphanumeric character code to be loaded repeatedly into consecutive character positions in the data memory 16, and to be displayed sequentially in a corresponding number of character positions on the screen 18, so long as the keys are held depressed. Similarly, when the REPT key is depressed and a control key is depressed, such as the space bar 72 or the BACKSPACE key, for example, the particular control function will similarly be repeated, so long as the keys are held depressed.

Figure 9:
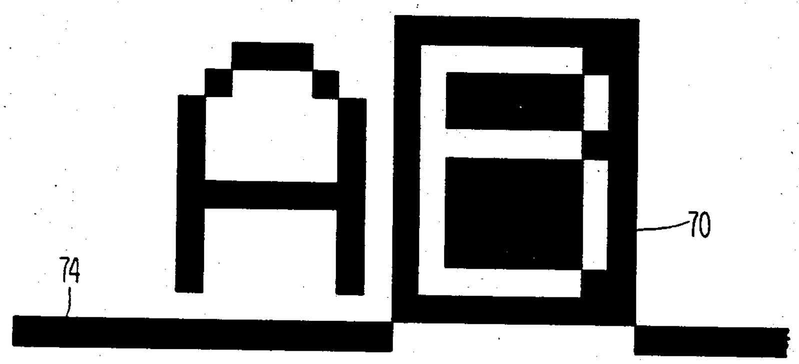
FIG. 9 illustrates an underscore and a particular display position of a screen marker or cursor.

The invention also provides the feature of permitting the operator (or associated device or data processor, when the display unit is in the receive mode) to highlight the display on the screen 18 by underlining or underscoring one or more characters as depicted in FIG. 9. In the present embodiment of the invention, one character area 32 has been devoted to the beginning of the underscore 74, and one character area 32 has been devoted to the ending of the underscore 74. In accordance with the particular logic chosen for the present embodiment of the invention, the underscore 74 begins and ends at a horizontal position of the particular character area 32 corresponding to the fifth timing period of the respective character areas 32. This places the beginning and ending points of an underscore 74 approximately at the center of the respective character spaces.

Underscoring is accomplished by first depressing the appropriate control keys to position the cursor 70 to the character position at which underscoring is to begin, and then depressing the SHIFT key and a complement underscore key CUN. This will cause the character code for CUN to be loaded into the data memory 16, and a control flip-flop to be set in the control logic. When the element line counter ELC is at count 11, the video logic circuits 48 will generate a series of signals for blanking the cathode-ray tube beam to display the underscore 74. So long as the control flip-flop is set, the underscoring will continue from character display line to character display lime as horizontal scanning by the cathode beam takes place. In order to terminate the underscore, the cursor 70 is positioned to the character position where it is desired to terminate, and then the SHIFT key and complement underscore key CUN are depressed for the second time. This serves to reset the control flip-flop and terminate the underscore.

The invention also provides the feature of permitting the operator to correct or other wise edit the data displayed on the screen 18, and without rewriting the entire display. Thus a character may be erased by first positioning the cursor 70 to the same character position where the character to be erased is located, and then depressing a RUBOUT key. By means of the control logic, depression of this key has the effect, on the write portion of the memory cycle, of preventing the character code from being written back into the date memory 16 from the particular buffer 22 or 24 by causing energization of all six of the data memory inhibit drivers 76 (FIG. 1A), so that an all-zero character code is written back in to the data memory 16. THe horizontal input/output counter 40 is counted by by one series of characters may be erased by first positioning the cursor 70, then depressing the REPT key, and then depressing the RUBOUT key. This causes a number of characters to be erased for as long as the keys are held depressed.

The invention also provides the feature of permitting the operator to overwrite an existing character with a new character without first erasing the existing character. This is accomplished by positioning the cursor 70 to the same position as the existing character, and then simply depressing the appropriate alphanumeric key on the keyboard 10 tor entering the new character. The new character will be encoded in the encoder of the keyboard 10, as described previously, and then transferred in to the data input/output register 68. The character code of the existing character will be read out of he data memory 16 into the appropriate buffer 22 or 24. On the write portion of the memory cycle, the new character code in the data input/output register 68 will be transferred into the appropriate buffer 22 or 24 to displace the character code of the existing character, and to be written in to the data memory 16 in the same character position from which the existing character code was read out. The horizontal input/output counter 40 will then be counted up by one count to cause the cursor 70 to be stepped rightwardly to the next character position.

earlier in this discussion, it was stated that the background area of the screen 18 was of one color, and that the characters displayed thereon were of a contrasting color. It was further assumed that in the present embodiment of the invention the background area of the screen 18 was white, and that the characters displayed thereon were black. These two colors correspond to unblanking and blanking signals, respectively.

Figure 7:
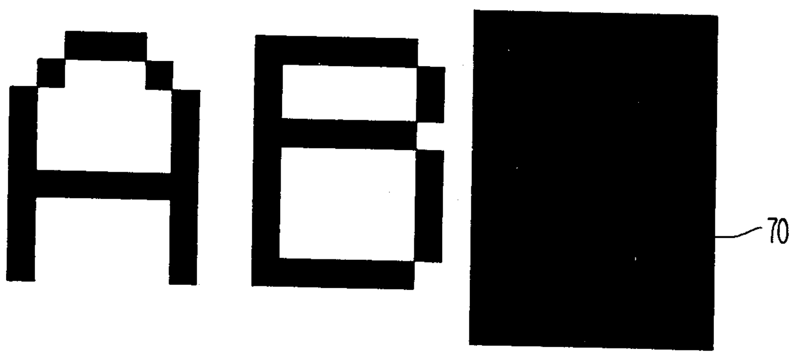
FIG. 7 is an enlarged view of a portion of the display of FIG. 6.

Now when the cursor 70 is positioned by itself so that it does not superimpose any character, as illustrated in FIGS. 6 and 7, both the alphanumeric characters and the cursor 70 call for blanking signals to present their display. A somewhat different situation exists when the censor 70 is positioned so that it superimposes a character, such as the illustrative letter "B" (FIG. 9), or when it superimposes the underscore 74. In this situation, since the letter "B," the cursor 70, and the underscore 74 all call for blanking signals, it would seem that the entire area superimposed by the cursor 70 would be black. This, however, would be undesirable, since the letter "B" and the underscore 74 would be indistinguishable. The problem is resolved by making the superimposed character and the underscore 74 take on the color which contrasts with the censor 70, and which in this case is white, the background color of the screen 18. This is accomplished by the logic circuitry of the video drive circuits 50 which compares the signal requirements for the cursor 70, the date character and the underscore 74. Thus, when the cursor 70 and the data character both call for blanking signals in their common area, or when the cursor 70 and the underscore 74 similarly both call for blanking signals in their common area, the logic circuitry of the video drive circuits 50 resolves the conflict by causing unblanking signals to be produced so that the common areas will be white.

The memory operations for reading and writing of input and output data in input/output operations are accomplished during the horizontal flyback period which, as indicated previously, occurs once every 63.36 $\mu$sec. The control and timing of input/output operations depend on the particular type of input/output interface that is utilized for any particular application. The illustrated embodiment of the invention illustratively utilizes a 2,400 bit per second interface which includes standard Bell Telephone Company 201B modems. This is a synchronous type of modem which supplies the clock for use of the display unit input/output operations. The display unit utilizes the 201B modem clock to synchronize the receipt and transfer of data. All logic associated with the input/output output section also utilizes this clock. The code format for input/output operations is the 7-bit code shown in FIG. 4, plus an additional parity bit for each character. This makes up an Transmission of data to an associated device via the send modem 78 (FIG. 2) is commenced by depressing the key for the letter "T" (FIG. 4), and by depressing a control key CTRL. This serves to delete or change the seventh bit $b_7$ of the character code for the letter "T" from a binary one to a binary zero and thereby convert this code to a TRANSMIT code. This causes the control logic to effectively connect the data input/output register 68 to the send modem 78 via a send mode control unit 80 (FIG. 2), to thereby place the display unit into the transmit mode.

The transmit section, or send mode control 80 (FIG. 2), working with the modem 78, generates discrete transmission characters such as idle or SYNC, start-of-message STX and end-of-message ETX. These characters are encoded in an encoder 81, transmitted in parallel to the data input/output register 68, and then transmitted serially from the data input/output register 68, at the 2,400 bit per second clock rate, to a send data flip-flop in the send mode control block 80 for insertion on the SEND DATA transmission line.

Transmission of a message commences with the generation of four SYNC characters by the send mode control 80 to synchronize the receiving station with the message to be transmitted. A start-of-message character, or start of text STX, is then transmitted, after which the display unit proceeds to acquire data from the memory 16 for transmission.

Addressing of the memory 16 for input/output operations is accomplished by means of the horizontal and vertical input/output counters 40 and 42. These counters do not count at any prescribed clock rat but are incremented at the illustrative rate of 2,400 bits per second, for this particular type of interface. As in the case of loading from the keyboard, the zero bit of the horizontal input/output counter 40 is used for determining the sequence in which two consecutive character codes are to be read out of or written into the individual words of the data memory 16. Accordingly, when in the transmit mode, two 6-bit characters are simultaneously read out of the data memory 16 and into the buffers 22 and 24. The zero bit of the horizontal input/output counter 40 determines which of the two buffers 22 or 24 will have its character code transferred first into the data input/output register 68.

In accordance with the standard code which contains seven data bits, a seventh bit is inserted into the sixth bit position $b_6$ of the data input/output register 68 by the control logic. This is accomplished by inverting the bit in the $b_7$ bit position and feeding it into the $b_6$ position of the register. The resulting 7-bit character is then transmitted serially from the data input/output register 68 to the send mode control 80, and a parity bit generated in the character code by a parity generator 82 and transmitted with the character code as the eight bit $b_8$ thereof.

As the characters are read from the data memory 16 for transmission, each character will modify a longitudinal parity register which is part of the send mode control 80, such that when the last character has been transmitted, the longitudinal parity register will contain the longitudinal parity for that message; and the longitudinal parity code will also be transmitted with the message. On decoding the memory 16 end-of-message character code GM, which is a group mark character code generated as an input from the keyboard 10, a decoder 85 (FIG. 2) in the output logic will effectively delete this character code and transmit the decode to the send mode control 80 to generate in its place and end-of-text code ETX for transmission. When the last bit of the ETX code is transmitted, which constitutes the end of the entire message, the logic will place the display unit into the receive mode.

In the event that the associated receiving station, which may be a data processor, calls for a retransmission of a message that was previously transmitted, it will send a retransmit code TRXMT (FIG. 4) to the data input/output register 68 via the modem 86 and a receive mode control 84, while the display unit is in the receive mode. The retransmit code will be detected in the date input/output register 68 by the control logic, which will then place the display unit back into the transmit mode and cause it to retransmit the previous message.

The invention also provides the feature of permitting the operator to transmit a selected portion of the keyboard area. The selected portion may be located in any position on the selected portion may be located in any position on the screen 18. The execution of this particular function is somewhat similar to that for underscoring.

Figure 10:
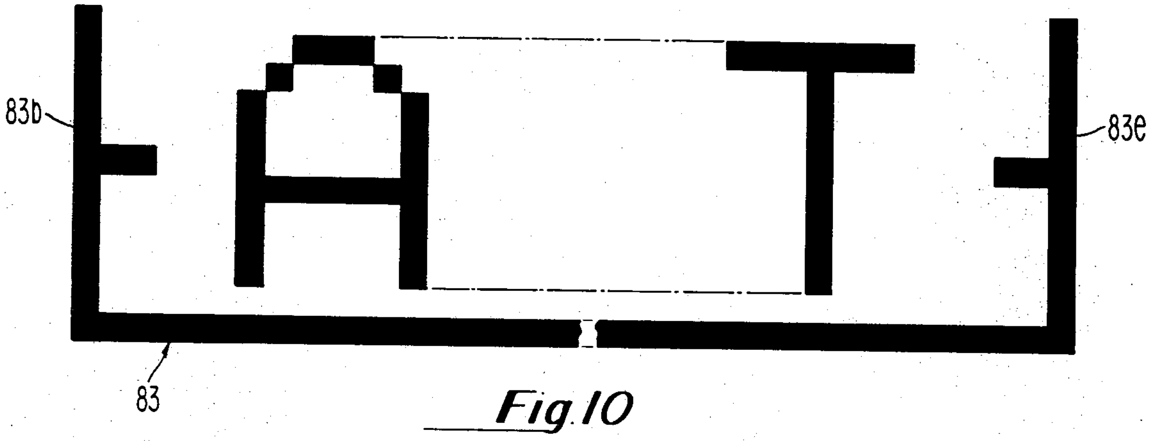
FIG. 10 illustrates the use of a displayable bracket for transmitting a preselected portion of a message.

Thus, for the purpose of explanation, it is assumed that it is desired to transmit a passage which is to be displayed on the medial portion of the screen 18, and which is to commence with the letter "A" and terminate with the letter "T," as depicted in FIG. 10. Selection of this passage for transmission is accomplished during loading of the message into the data memory 16 and is commenced by depressing the SHIFT key and a BKA key (begin keyboard area) when the cursor 70 is at the position where the selected passage is to begin. In the present embodiment of the invention, and similar to the underscoring function, one character area 32 has been devoted to the beginning **83*b* of the bracket 83, and one character 32 has been devoted to the ending 83*e* of the bracket 83. In accordance with the particular logic chosen for the present embodiment of the invention, the beginning and ending 83*b* and 83*e* of the bracket are at a horizontal position of their particular character areas 32 corresponding to the fifth timing period of the particular character areas 32. Thus the beginning 83*b* and the ending 83*e* of the bracket 83 are at the horizontal center of their respective character areas 32**.

When the BKA key is depressed, as described above, the character code for BKA is loaded into the data memory 16 and a control flip-flop is set in the control logic so that the underscoring portion of the bracket 83 will continue from the beginning **83*b* until it is terminated at the ending 83*e*. A second flip-flop is also set in the control logic which inhibits the transmission of any character previous to the BKA character. When the cursor 70 is at the end of the selected passage, the bracket 83 is terminated by depressing the SHIFT key and an EKA key (end of keyboard area). This serves to reset the first flip-flop which terminates the bracket 83 and which inhibits the transmission of any character following the bracket ending 83*e*. The character The character code for EKA is also loaded into the data memory 16 to cause generation of the display of the bracket ending 83*e*. Thus, when the operator effects transmission only the portion of the message embraced by the bracket 83** will be transmitted to the data processor.

It is noted that while only nine rows of cores 54 and nine corresponding element line drivers 66 have been shown and discussed to illustrate the display of a normal character, such as the letter "A, " three additional rows of cores 54 and three additional corresponding element line drivers 66 are used for generating the display of special characters such as, for example, the underscore 74, the beginning and ending **83*b* and 83*e* of the bracket 83, which occupy the full height of an area 32, and vertical lines which also occupy the full height of an area 32**.

In the receive mode, the remote station, or data processor, generates four SYNC characters to the data input/output register 68 via the modem 86 and the receive mode control 84, and these characters are decoded by the decoder 85 to cause synchronization of the display unit with the message to be sent. A start-of-text character STX is then similarly transmitted to the data input/output register 68 and decoded in the decoder 85 to condition control logic for receipt of the message data. The data characters constituting the incoming message then proceed to feed serially into the data input/output register 68. A parity check is made on the incoming characters by a parity check circuit 90. After the parity check, the $b_8$ parity bit is discarded. In accordance with the 6-bit character code chosen for internal operations of the illustrated embodiment of the invention, the sixth bit $b_6$ of the resulting 7-bit incoming character code, which is now in the data input/output register 68, is deleted therein by the control logic so that the resulting character code in the data input/output register 68 is a 6-bit character code compatible with the data memory 16.

During the horizontal flyback period, the character code is transferred from the data input/output register 68 into the appropriate buffer 22 or 24, as determined by the zero bit of the horizontal input/output counter 40, and then written into the memory 16 at the address specified by the horizontal and vertical input/output counters 40 and 42.

The invention also provides the feature of permitting the associated data processor to transmit a message to the display unit and have it displayed on a selected area of the screen 18, in accordance with a selection which is made by the data processor. This is accomplished by the data processor by causing the cursor 70 to be positioned to the character position on the screen 18, at which the message to be displayed is to commence. Accordingly, when the display unit is in the receive mode, it will first receive an escape code ESC (FIG. 4) from the data processor via the modem 86, and receive mode control 84. The escape code ESC will be decoded in the decoder 85 to condition the control logic for this type of operation. Upon receipt and detection of the succeeding character code HJ (horizontal jump) in the data input/output register 68, the horizontal input/output counter 40 will be reset by the control logic to its first position so that the cursor 70 will make a rapid horizontal jump to the first character position CP–1.

A third character code will next be received from the data processor which will contain the code value for the horizontal position at which the cursor 70 is to be located. This code will also be detected in the horizontal input/output register 68 so as to cause the horizontal input/output counter 40 to be preset to the horizontal value of the third character code so as to cause the cursor 70 to be stepped rightwardly in one step to the corresponding horizontal character position on the screen 18. Unless the cursor 70 is to also be positioned vertically on the screen 18, the following codes received from the data processor will be the data character codes which constitute the body of the message. If the cursor 70 has been selected by the data processor to have a particular vertical location on the screen 18, other than its existing vertical location, the data processor will, as previously, first cause the escape code ESC to be transmitted into the data input/output register 68 and will then send a VJ code (vertical jump) into the data/output register 68 which, when detected therein by the control logic, will cause the vertical input/output counter 42 to be reset to its first position so that the cursor 70 will step upwardly in one step on the screen 18 to the first display line position DL–1. This will be followed by receipt of a code from the data processor which will contain the vertical value for locating the cursor 70 so that when it is detected in the data input/output register 68 it will cause the vertical input/output counter 42 to be preset to the corresponding vertical value so as to cause the cursor 70 to make a single step down from the first display line position DL–1 to the appropriate vertical display line position. Thus the cursor 70 may be set by the data processor to any position on the screen 18 with only four one-step movements.

The invention also provides the feature of permitting the data processor to cause transmission of the entire screen area 18, or only a selected portion thereof.

Figures 4, 5:
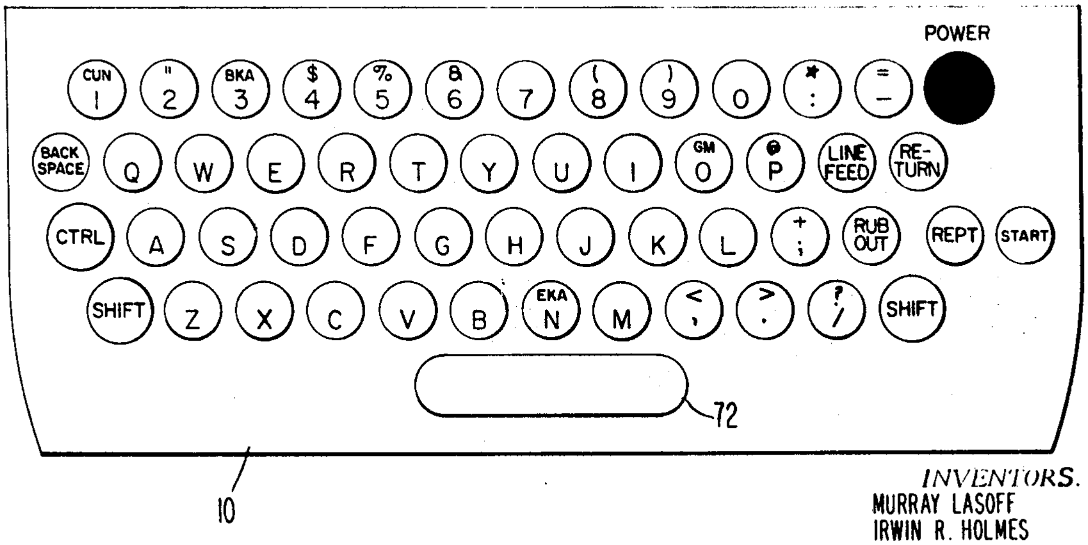
FIG. 4 shows a tabulation of illustrative symbol or character codes and control codes.
FIG. 5 illustrates a keyboard which is used for manual entry of data into the display unit, and for executing certain control functions.

If the data processor requires transmission of a selected portion of the screen area 18, it will transmit a SET KATF code FIG. 4) which, when received by the display unit and detected in the data input/output register 68, will cause a control flip-flop in the keyboard logic circuitry to be set such that in subsequent transmissions from the display unit to the data processor, only data which is embraced by the bracket 83 will be transmitted. If the data processor requires transmission of the entire screen area 18, it will transmit a RESET KATF code (FIG. 4) which when detected in the data input/output register 68 will cause the control flip-flop for the SET KATF code to be reset so that the entire display on the screen 18 will be transmitted to the data processor.

We claim:

1. A display unit comprising a display medium having horizontal and vertical character display positions, a storage device having a plurality of word locations each having a horizontal address and a vertical address and each having means to contain a plurality of character codes, an interface connectable to an associated device for receiving input data, means for changing said input data into character codes each representing a character to be displayed on said display medium, means for loading a plurality of said character codes into each of said word locations, horizontal means for sequentially addressing the horizontal addresses of said word locations and for establishing the corresponding horizontal character display positions of the character codes therein, vertical means for sequentially addressing the vertical addresses of said word locations and for establishing the corresponding vertical character display positions of the character codes therein, means for transferring said addressed multiple character code words in succession into a storage means, and display generating means responsive in succession to each character code of each word in said storage means for generating successive displays, at the successive corresponding character display positions established by said horizontal and vertical means, of at least a portion of each of the corresponding characters of each word.

2. A display unit according to claim 1 wherein said display medium is a cathode-ray tube and said display generating means includes means for positioning, blanking and unblanking of the cathode beam.

3. A display unit according to claim 2 characterized further by the provision of a source of timing signals for operating said display unit in repetitive display cycles, and wherein said horizontal and vertical means are counters, each responsive to count pulses derived from said timing signals for providing output states indicative of the respective horizontal and vertical addresses and character display positions.

4. A display unit according to claim 3 wherein said cathode-ray tube is part of a standard television monitor provided with horizontal and vertical sweep circuits operated in timed relation to said timing signals and wherein said vertical counter is part of a vertical scan system which responds to a timing signal for generating the vertical sync signal for synchronizing said vertical sweep circuit.

5. A display unit according to claim 3 wherein said storage device is an addressable magnetic memory, said plurality of character codes in each word are two codes, and said storage means is constituted by two storage registers each for storing one of the two character codes of each word.

6. A display unit according to claim 5 characterized further by the provision of a control means, and wherein said horizontal counter is a multiple-bit counter of which one bit provides output states to said control means for controlling the sequence in which the character codes in said two storage registers are responded to by said display generating means and of which the remaining bits provide the horizontal address to said magnetic memory.

7. A display unit according to claim 6 wherein each character to be displayed is composed of a number of substantially horizontal element lines in the display on said cathode-ray tube, and said display generating means includes means for decoding in succession the character codes in said two registers and means for converting said decoded data into two groups of signals for generating the respective displays of one of said horizontal element lines of each character represented by the character codes in said two registers.

8. A display unit according to claim 7 characterized further by the provision of an element line counter responsive to count pulses derived from said source of timing signals for providing output states to said display generating means each for selecting a particular one of said substantially horizontal element lines to be displayed.

9. A display unit according to claim 7 characterized further by the provision of a horizontal input/output counter having a plurality of output states corresponding to the output states of said horizontal counter, a vertical input/output counter having a plurality of output states corresponding to the output states of said vertical counter, means for selectively setting each of said horizontal and vertical input/output counters to one of its states corresponding to a character display position at which it is desired to display a cursor marker symbol, and means operative during said display cycles for comparing the output state of said horizontal counter with the set state of said horizontal input/output counter and for comparing the output state of said vertical counter with the set state of said vertical input/output counter and for providing an output signal in the event said states meet a standard of comparison indicative of the fact that said horizontal counter and vertical counter are at the address of said character display position at which it is desired to display said cursor, and wherein said display generating means includes means responsive to said output signal for generating the display of one of said horizontal element lines of said cursor.

10. A display unit comprising a display medium having horizontal and vertical character display positions, an addressable magnetic memory having a plurality of word locations each having a horizontal address corresponding to the address of a plurality of said horizontal character display positions and a vertical address corresponding to one of said vertical character display positions, each of said word locations having means to contain a plurality of character codes in particular character code positions, an interface connectable to an associated device for receiving input data, means for changing said input data into character codes each representing a character to be displayed on said display medium at one of said character display positions, a horizontal input device selectively settable to address said memory at the horizontal address of a desired one of said word locations, a vertical input device selectively settable to address said memory at the vertical address of said desired one of said word locations, an input storage register means for transferring each input character code into said input storage register, a plurality of buffer registers each having means to store a character code which is to be written into a particular character code position in each of said word locations, control means actuated by the set state of said horizontal input device for gating said input character code from said input storage register into a particular buffer register as specified by said set state, means for writing said input character code from said particular buffer register into the particular character code position of the corresponding word location, and means responsive to successive readout of said word locations for generating a display on said display medium of the characters represented by the character codes therein.

11. Display apparatus for displaying in dot matrix form characters composed of interlaced element lines of displayable dots comprising a cathode-ray tube having horizontal and vertical sweep circuits and video circuits adapted to control the cathode beam to obtain horizontal interlaced element line scanning at the rate of 60 fields per second and 30 frames per second, an addressable magnetic memory having a plurality of word locations each having a horizontal address and a vertical address corresponding to the address of a plurality of character display positions on the screen of said cathode-ray tube, an interface connectable to an associated device for receiving input data, means for changing said input data into character codes each representing a character to be displayed on said screen, means for loading a plurality of said character codes into each of said word locations, a source of timing signals, a horizontal counter responsive to count pulses derived from said timing signals for providing output states for sequentially addressing the horizontal addresses of said word locations, a display line counter responsive to count pulses derived from said timing signals for providing output states for sequentially addressing the vertical address of said word locations, a plurality of storage registers, means for simultaneously reading out the character codes of each addressed word location and placing each character code into one of said storage registers, a character generator comprising a matrix of magnetic elements arranged in rows, each row of magnetic elements corresponding to one of said element lines of displayable dots, a plurality of character lines each inductively coupled to certain ones of said magnetic elements in each row, energizing means responsive in a predetermined sequence to each character code in said plurality of storage registers for energizing, for each character code, one of said character lines to magnetically disturb the magnetic elements inductively coupled thereto, an element line counter responsive to count pulses derived from said timing signals for providing output states certain of which each correspond to one of said element lines of displayable dots, means responsive to each of said certain output states of said element line counter for inhibiting the magnetic disturbance of all rows of magnetic elements except one of said rows of magnetic elements, and means actuated by signals and signal levels derived from the disturbance of the magnetic elements and from any undisturbed magnetic elements, respectively, of said excepted row of magnetic elements for providing a sequence of signals to be converted into video signals to said video circuits for generating the display of the corresponding element line, and control means responsive to the output states of said horizontal counter for gating the character codes from said plurality of storage registers to said energizing means in said predetermined sequence.

12. Display apparatus in accordance with claim 11 characterized further by the provision of means for generating a series of signals to said video circuits for generating the display of an underscore of one or more characters.

13. Display apparatus in accordance with claim 11 wherein said interface is an input/output interface connected to permit the communication of character codes between said plurality of storage registers and said associated device, and characterized further by means enabling an operator to visually and manually preselect any portion of a character message being displayed and to effect transmission of the character codes representing said preselected portion to said associated device.

14. Display apparatus in accordance with claim 11 wherein the odd and even element lines of each said frame resulting from said interlaced element line scanning are identical in appearance so that each dot of each character appears twice as high in said frame as it does in the single fields constituting said frame.

PO-1050
(5/69)

UNITED STATES PATENT OFFICE
CERTIFICATE OF CORRECTION

Patent No. 3,609,743 Dated Sept. 28, 1971

Inventor(s) Murray Lasoff, et al

It is certified that error appears in the above-identified patent and that said Letters Patent are hereby corrected as shown below:

Column 1, line 28, change "specially" to --specifically--; line 62, change "date" to --data--. Column 3, line 1, change "180" to --18--; line 20, change "line" to --lines--; line 46, change "utilized" to --utilizes--. Column 4, line 52, change "DCL" to --DLC--. Column 5, line 7, change "date" to --data--; line 12, change "syne" to --sync--; line 53, change "counter" to --counts--. Column 6, line 34, change "date" to --data--; line 36, after character insert --in the buffer 24 will be displayed in--; line 40, change "date" to --data--; line 67, "screen" to -- seven--; line 75, change "date" to --data--. Column 7, line 3, after "two-character" insert --word will be transmitted from the buffer 24 to the character--; delete line 22; line 45, change "The" to --the--; line 52 after "inclusive" change the "comma (,)" to a --period (.)--; line 64, change "writer" to --write--; line 65, change " Ag" " to --in--; line 73, change "date" to --data--. Column 8, line 8, change "THe" to --The--; line 18, change "lime" to --line--; line 20, change "1" to --2--; line 46, change "area" to --zero--; line 64, change "date" to --data--. Column 9, lines 1, 3 and 4, change "date" to --data--; line 8, after "the" third occurrence) insert --data--; line 9, cancel "data/output" and insert therefore --input/output--; line 12, change "date" to --data--; line 15, change "one" to --on--; line 20, change "date" to --data--; line 31, change "date" to --data--; line 39, change "date" to --data--, line 41 after "The" insert --character code in the buffer 22 is then written into the first--; line 43, cancel "during" (second occurrence); lines 44 and 45, cancel "the display cycles as the first character on the screen 18"; line 58, change "date" to --data--; line 59 change "date" to --data--; line 68, after "two" insert --data--. Column 10, line 5, after "DL-2" insert --on--; line 67, change "ease" to --case--. Column 11, line 54, change "lime" to --line--; line 70, change "date" to --data--; line 74, change "THe" to --The--. Column 12, line 11, change "tor" to --for--; line 26 change "earlier" to --Earlier--;

PO-1050
(5/69)

UNITED STATES PATENT OFFICE
CERTIFICATE OF CORRECTION

Patent No. 3,609,743 Dated Sept. 28, 1971

Inventor(s) Murray Lasoff, et al

It is certified that error appears in the above-identified patent and that said Letters Patent are hereby corrected as shown below:

Column 12, line 38, change "censor" to --cursor--; line 47, change "censor" to --cursor--; line 51, change "date" to --data--. Column 13, line 73, change "date" to --data--. Column 14, lines 3 and 4, delete "on the selected portion may be located in any position"; line 40, delete "The character (first occurrence). Column 16, line 43, after "two" insert --character--.

Signed and sealed this 9th day of May 1972.

(SEAL)
Attest:

EDWARD M.FLETCHER,JR.
Attesting Officer

ROBERT GOTTSCHALK
Commissioner of Patents